(12) United States Patent
Nishi

(10) Patent No.: US 11,746,213 B2
(45) Date of Patent: Sep. 5, 2023

(54) MODIFIER FOR POLYESTER-BASED RESIN FILM, POLYESTER-BASED RESIN COMPOSITION, POLYESTER-BASED RESIN FILM, AND MULTILAYER FILM

(71) Applicant: TAKEMOTO YUSHI KABUSHIKI KAISHA, Aichi (JP)

(72) Inventor: Yusuke Nishi, Aichi (JP)

(73) Assignee: TAKEMOTO YUSHI KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/945,453

(22) Filed: Sep. 15, 2022

(65) Prior Publication Data

US 2023/0091790 A1    Mar. 23, 2023

(30) Foreign Application Priority Data

Sep. 16, 2021 (JP) .................................. 2021-150760

(51) Int. Cl.
*C08K 5/42* (2006.01)
*C08K 3/30* (2006.01)

(52) U.S. Cl.
CPC .................. *C08K 5/42* (2013.01); *C08K 3/30* (2013.01); *C08K 2003/3045* (2013.01); *C08K 2201/014* (2013.01)

(58) Field of Classification Search
CPC ..... C08K 3/16; C08K 2003/3045; C08K 5/42
See application file for complete search history.

(56) References Cited

U.S. PATENT DOCUMENTS

2017/0349703 A1   12/2017   Nakamura et al.

FOREIGN PATENT DOCUMENTS

| JP | 52-47071 A | 4/1977 |
|----|----|----|
| JP | 60-38123 A | 2/1985 |
| JP | 63-308059 A | 12/1988 |
| JP | 5-230239 A | 9/1993 |
| JP | 8-253662 A | 10/1996 |
| JP | 2005-162910 A | 6/2005 |
| JP | 2009-221287 A | 10/2009 |
| JP | 2016-138169 A | 8/2016 |
| JP | 2018-193424 A | 12/2018 |
| JP | 2021-123109 A | 8/2021 |
| WO | 2021/177081 A1 | 9/2021 |

OTHER PUBLICATIONS

Machine translation of JP2018193424 (Year: 2018).*
Machine translation of JP2009221287 (Year: 2009).*
Japanese 1st Office Action (1st JPOA) dated Nov. 16, 2021 for Japanese Patent Application No. 2021-150760 English machine translation.
Japanese 2nd Office Action (2nd JPOA) dated Mar. 8, 2022 for Japanese Patent Application No. 2021-150760; English machine translation.
Japanese Decision to Grant dated Jun. 28, 2022 for Japanese Patent Application No. 2021-150760; English machine translation.

* cited by examiner

*Primary Examiner* — Wenwen Cai
(74) *Attorney, Agent, or Firm* — Rankin, Hill & Clark LLP

(57) ABSTRACT

Provided is a modifier for a polyester-based resin film, containing alkali metal salt of alkylaryl sulfonic acid (A) in which an alkyl group includes 6 to 22 carbons, and an inorganic salt (B), the inorganic salt (B) being at least one selected from sodium sulfate, potassium sulfate, lithium sulfate, sodium chloride, potassium chloride, and lithium chloride.

13 Claims, No Drawings

MODIFIER FOR POLYESTER-BASED RESIN FILM, POLYESTER-BASED RESIN COMPOSITION, POLYESTER-BASED RESIN FILM, AND MULTILAYER FILM

CROSS-REFERENCE TO RELATED APPLICATION

This application claims priority from Japanese Patent Application No. 2021-150760 filed with the Japan Patent Office on Sep. 16, 2021, the entire content of which is hereby incorporated by reference.

BACKGROUND

1. Technical Field

The present disclosure relates to a modifier for a polyester-based resin film, and a polyester-based resin composition, a polyester-based resin film, and a multilayer film which include such a modifier.

2. Related Art

As a typical container for packaging food or the like, a container having an easy-peel film, which can be peeled off by hand easily, pasted on a main body of the container has been used widely. Moreover, the easy-peel film is required to have excellent transparency, anti-fogging property, anti-static property, and the like in accordance with the purposes from the viewpoints of the visibility, the productivity, and the like of the content of a packaging container.

Such a container includes a container main body that is generally formed of polyester-based resin such as polyethylene terephthalate, and the easy-peel film is formed of polyolefin resin or a mixture including polyolefin resin and adhesive resin. In recent years, however, the packaging container is also required to be recyclable in view of the concern for the environment, and it has been desired to form an easy-peel film with the polyester-based resin, which is the same material as the container main body.

One method that has been employed widely to improve the properties of the polyester-based resin is to add a modifier. For example, JP-A-52-47071 discloses a method of manufacturing a polyester film including a step of mixing polyalkylene glycol and a derivative of metal salt of sulfonic acid with a polyester-based resin. JP-A-63-308059 discloses a polyester composition containing a polyester-based resin, a derivative of metal salt of sulfonic acid, and aromatic amine and/or ammonium salt thereof. JP-A-60-38123 discloses a polyester film in which a derivative of metal salt of sulfonic acid and metal salt of higher fatty acid are mixed with a polyester-based resin. JP-A-2005-162910 discloses a polyester resin composition in which polyalkylene glycol and organic calcium sulfonate are mixed with a polyester-based resin. However, the main object of these is to improve the antistatic property, and the improvement of the anti-fogging property has not been examined.

SUMMARY

A modifier for a polyester-based resin film according to the present invention contains alkali metal salt of alkylaryl sulfonic acid (A) in which an alkyl group includes 6 to 22 carbons, and an inorganic salt (B), the inorganic salt (B) being at least one selected from sodium sulfate, potassium sulfate, lithium sulfate, sodium chloride, potassium chloride, and lithium chloride.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the above, it is an object of the present disclosure to provide a modifier for a polyester-based resin film that enables a polyester-based resin film used for packaging food or the like to have the excellent anti-fogging property. Moreover, a polyester-based resin composition, a polyester-based resin film, and a multilayer film which include such a modifier are also provided.

As a means to achieve the object, the present disclosure provides the following means.

[1] A modifier for a polyester-based resin film, containing alkali metal salt of alkylaryl sulfonic acid (A) in which an alkyl group includes 6 to 22 carbons, and an inorganic salt (B), the inorganic salt (B) being at least one selected from sodium sulfate, potassium sulfate, lithium sulfate, sodium chloride, potassium chloride, and lithium chloride.

[2] The modifier for a polyester-based resin film according to [1], in which the alkali metal salt of alkylaryl sulfonic acid (A) is sodium salt.

[3] The modifier for a polyester-based resin film according to [1] or [2], in which the alkyl group of the alkali metal salt of alkylaryl sulfonic acid (A) is a branched alkyl group.

[4] The modifier for a polyester-based resin film according to any one of [1] to [3], in which the inorganic salt (B) is at least one selected from sodium sulfate and sodium chloride.

[5] The modifier for a polyester-based resin film according to any one of [1] to [4], in which the inorganic salt (B) is contained by 0.1 to 20 parts by mass per 100 parts by mass of the alkali metal salt of alkylaryl sulfonic acid (A).

[6] The modifier for a polyester-based resin film according to any one of [1] to [5], further containing alkali metal salt of alkyl sulfonic acid (C) in which an alkyl group includes 6 to 22 carbons.

[7] The modifier for a polyester-based resin film according to [6], in which the alkali metal salt of alkyl sulfonic acid (C) is contained by 10 to 300 parts by mass per 100 parts by mass of the alkali metal salt of alkylaryl sulfonic acid (A).

[8] The modifier for a polyester-based resin film according to any one of [1] to [7], further containing polyalkylene glycol (D).

[9] The modifier for a polyester-based resin film according to [8], in which the polyalkylene glycol (D) is contained by 10 to 1000 parts by mass per 100 parts by mass of the alkali metal salt of alkylaryl sulfonic acid (A).

[10] A polyester-based resin composition containing a polyester-based resin, and the modifier for a polyester-based resin film according to any one of [1] to [9].

[11] A polyester-based resin film containing the polyester-based resin composition according to [10].

[12] A multilayer film including two or more layers, in which a surface layer of at least one of the layers is the polyester-based resin film according to [11].

<<Modifier for Polyester-Based Resin Film>>

A modifier for a polyester-based resin film (hereinafter also referred to as modifier) contains alkali metal salt of alkylaryl sulfonic acid (A) and an inorganic salt (B). When the polyester-based resin film contains the modifier, the film can have higher anti-fogging property. When the modifier additionally contains at least one of alkali metal salt of alkyl sulfonic acid (C) and polyalkylene glycol (D), the polyester-based resin film can have much higher anti-fogging property. Note that the anti-fogging property can be enhanced further when the modifier contains both the alkali metal salt of alkyl sulfonic acid (C) and the polyalkylene glycol (D) compared to when the modifier contains one of the alkali metal salt of alkyl sulfonic acid (C) and the polyalkylene glycol (D).

<Alkali Metal Salt of Alkylaryl Sulfonic Acid (A)>

The alkali metal salt of alkylaryl sulfonic acid (A) includes an alkyl group with 6 to 22 carbons. The alkyl group includes preferably 8 to 20 carbons, and more preferably 9 to 16 carbons. The alkyl group may have either a straight chain or a branched chain, and from the viewpoints of the anti-fogging property and the kneadability with the polyester-based resin (productivity of masterbatch in Examples), the alkyl group preferably has a branched chain. Since the alkyl group with a branched chain has higher solubility in the polyester-based resin than the alkyl group with a straight chain, the alkyl group with a branched chain is assumed to have a higher effect than the alkyl group with a straight chain. Note that this assumption is just a consideration and will not limit the content of the present disclosure. The aryl group may be either monocyclic or polycyclic. Examples of the alkali metal salt include sodium salt, potassium salt, and lithium salt, and from the viewpoint of the anti-fogging property, sodium salt is preferable. The alkali metal salt of alkylaryl sulfonic acid (A) may be used singly or in combination of two or more kinds thereof. In particular, when the alkyl group of the alkali metal salt of alkylaryl sulfonic acid (A) has a branched chain, an isomer mixture may be used.

Examples of the alkali metal salt of alkylaryl sulfonic acid (A) include sodium hexylbenzene sulfonate, sodium 4-(2-methylpentyl)benzene sulfonate, sodium 4-(1-ethylbutyl)benzene sulfonate, potassium heptylbenzene sulfonate, sodium 4-(1-methylhexyl)benzene sulfonate, sodium 4-(2-ethylpentyl)benzene sulfonate, sodium 4-(1-propylbutyl)benzene sulfonate, potassium octylbenzene sulfonate, sodium 4-(2-methylheptyl)benzene sulfonate, sodium 4-(1-ethylhexyl)benzene sulfonate, sodium 4-(1-propylpentyl)benzene sulfonate, sodium nonylbenzene sulfonate, sodium 4-(1-methyloctyl)benzene sulfonate, sodium 4-(2-ethylheptyl)benzene sulfonate, sodium 4-(1-propylhexyl)benzene sulfonate, sodium 4-(1-butylpentyl)benzene sulfonate, sodium decylbenzene sulfonate, sodium 4-(2-methylnonyl)benzene sulfonate, sodium 4-(2-ethyloctyl)benzene sulfonate, sodium 4-(1-propyloctyl)benzene sulfonate, sodium 4-(1-butylhexyl)benzene sulfonate, sodium undecylbenzene sulfonate, sodium 4-(1-methyldecyl)benzene sulfonate, sodium 4-(1-ethylnonyl)benzene sulfonate, sodium 4-(2-propyloctyl)benzene sulfonate, sodium 4-(1-butylheptyl)benzene sulfonate, sodium 4-(1-pentylhexyl)benzene sulfonate, sodium dodecylbenzene sulfonate, sodium 4-(2-methylundecyl)benzene sulfonate, sodium 4-(1-ethyldecyl)benzene sulfonate, sodium 4-(1-propylnonyl)benzene sulfonate, sodium 4-(1-butyloctyl)benzene sulfonate, sodium 4-(1-pentylheptyl)benzene sulfonate, sodium 4-(2,2,4,4,6-pentamethylheptyl)benzene sulfonate, sodium tridecylbenzene sulfonate, sodium 4-(1-methyldodecyl)benzene sulfonate, sodium 4-(1-ethylundecyl)benzene sulfonate, sodium 4-(2-propyldecyl)benzene sulfonate, sodium 4-(1-butylnonyl)benzene sulfonate, sodium 4-(1-pentyloctyl)benzene sulfonate, sodium 4-(1-hexylheptyl) benzene sulfonate, sodium tetradecylbenzene sulfonate, sodium 4-(1-ethyldodecyl)benzene sulfonate, sodium 4-(2-propylundecyl)benzene sulfonate, sodium pentadecylbenzene sulfonate, sodium 4-(1-butylundecyl)benzene sulfonate, sodium 4-(2-heptyloctyl)benzene sulfonate, sodium hexadecylbenzene sulfonate, sodium 4-(1-hexylnonyl)benzene sulfonate, sodium 4-(1-propyltridecyl)benzene sulfonate, sodium 4-(1-butyldodecyl)benzene sulfonate, sodium heptadecylbenzene sulfonate, sodium 4-(1-pentyldodecyl)benzene sulfonate, sodium 4-(1-octylnonyl)benzene sulfonate, sodium octadecylbenzene sulfonate, sodium 4-(1-hexyldodecyl)benzene sulfonate, sodium 4-(1-octyldecyl)benzene sulfonate, sodium nonadecylbenzene sulfonate, sodium 4-(1-ethylheptadecyl)benzene sulfonate, sodium icosylbenzene sulfonate, sodium 4-(2-pentylpentadecyl)benzene sulfonate, sodium henicosylbenzene sulfonate, sodium 4-(1-butylheptadecyl)benzene sulfonate, sodium behenylbenzene sulfonate, sodium 4-(1-butyloctadecyl)benzene sulfonate, and sodium 7-hexylnaphthalene sulfonate.

<Inorganic Salt (B)>

The inorganic salt (B) is at least one selected from sodium sulfate, potassium sulfate, lithium sulfate, sodium chloride, potassium chloride, and lithium chloride. The inorganic salt (B) is preferably at least one selected from sodium sulfate and sodium chloride from the viewpoint of transparency.

<Alkali Metal Salt of Alkyl Sulfonic Acid (C)>

The alkali metal salt of alkyl sulfonic acid (C) includes an alkyl group with 6 to 22 carbons. The alkyl group includes preferably 8 to 20 carbons, and more preferably 10 to 18 carbons. The alkyl group may have either a straight chain or a branched chain. Examples of the alkali metal salt include sodium salt, potassium salt, and lithium salt. The alkali metal salt of alkyl sulfonic acid (C) may be used singly or in combination of two or more kinds thereof.

Examples of the alkali metal salt of alkyl sulfonic acid (C) include lithium hexylsulfonate, sodium hexylsulfonate, potassium hexylsulfonate, lithium octylsulfonate, sodium octylsulfonate, potassium octylsulfonate, lithium nonylsulfonate, sodium nonylsulfonate, potassium nonylsulfonate, lithium decylsulfonate, sodium decylsulfonate, potassium decylsulfonate, lithium undecylsulfonate, sodium undecylsulfonate, potassium undecylsulfonate, lithium dodecylsulfonate, sodium dodecylsulfonate, potassium dodecylsulfonate, lithium tridecylsulfonate, sodium tridecylsulfonate, potassium tridecylsulfonate, lithium tetradecylsulfonate, sodium tetradecylsulfonate, potassium tetradecylsulfonate, lithium pentadecylsulfonate, sodium pentadecylsulfonate, potassium pentadecylsulfonate, lithium hexadecylsulfonate, sodium hexadecylsulfonate, potassium hexadecylsulfonate, lithium heptadecylsulfonate, sodium heptadecylsulfonate, potassium heptadecylsulfonate, lithium octadecylsulfonate, sodium octadecylsulfonate, potassium octadecylsulfonate, lithium nonadecylsulfonate, sodium nonadecylsulfonate, potassium nonadecylsulfonate, lithium icosylsulfonate, sodium icosylsulfonate, potassium icosylsulfonate, lithium henicosylsulfonate, sodium henicosylsulfonate, potassium henicosylsulfonate, lithium docosylsulfonate, sodium docosylsulfonate, and potassium docosylsulfonate.

<Polyalkylene Glycol (D)>

As the polyalkylene glycol (D), polyethylene glycol, polypropylene glycol, polytetramethylene glycol, or the like can be used, and in particular, polyethylene glycol is preferable. Alternatively, the polyalkylene glycol (D) may be a copolymer of two or more kinds of ethylene glycol, propylene glycol, tetramethylene glycol, and the like, or may be a block copolymer or a random copolymer. The polyalkylene glycol (D) may be an end-capped type in which one end or both ends are replaced by an organic group. The polyalkylene glycol (D) has a weight average molecular weight of preferably 200 to 30000, and more preferably 400 to 20000.

<Content Ratio>

The modifier contains preferably 0.1 to 20 parts by mass, more preferably 0.1 to 10 parts by mass, of the inorganic salt (B) per 100 parts by mass of the alkali metal salt of alkylaryl sulfonic acid (A) from the viewpoints of the anti-fogging property and the transparency. When the modifier contains the alkali metal salt of alkyl sulfonic acid (C), the modifier contains preferably 10 to 300 parts by mass, more preferably 10 to 100 parts by mass, of the alkali metal salt of alkyl sulfonic acid (C) per 100 parts by mass of the alkali metal salt of alkylaryl sulfonic acid (A) from the viewpoints of the anti-fogging property and the transparency. When the modifier contains the polyalkylene glycol (D), the modifier contains preferably 10 to 1000 parts by mass, more preferably 10 to 300 parts by mass, of the polyalkylene glycol (D) per 100 parts by mass of the alkali metal salt of alkylaryl sulfonic acid (A) from the viewpoints of the anti-fogging property and the productivity of a polyester-based resin composition and a polyester-based resin film.

<<Polyester-Based Resin Composition>>

Next, the polyester-based resin composition according to the present disclosure is described. The polyester-based resin composition contains the polyester-based resin and the modifier, and includes a masterbatch containing the modifier at high concentration, an intermediate product from a manufacturing process for a polyester-based resin film, which is described below, and the like.

<Polyester-Based Resin>

As the polyester-based resin, a known resin with a basic structure formed by a polycondensate of polyvalent carboxylic acid and polyvalent alcohol may be used. The polyvalent carboxylic acid is not limited in particular and examples thereof include aliphatic compounds such as oxalic acid, succinic acid, glutaric acid, adipic acid, sebacic acid, dimer acid, dodecanedioic acid, and 1,6-cyclohexane dicarboxylic acid, and aromatic dicarboxylic acid such as alicyclic dicarboxylic acid, terephthalic acid, isophthalic acid, naphthalene dicarboxylic acid, and diphenyl dicarboxylic acid. As the polyvalent carboxylic acid, one kind thereof or a mixture of two or more kinds thereof can be used. On the other hand, the polyvalent alcohol is not limited in particular, and examples thereof include aliphatic compounds such as 1,2-ethane diol, 2,2'-oxydiethanol, 2,2'-(ethylenedioxy)diethanol, 1,3-propanediol, 1,2-propanediol, 1,4-butanediol, 1,5-pentanediol, 1,6-hexanediol, 1,4-cyclohexanediol, 1,4-cyclohexanedimethanol, and isosorbide, alicyclic diol units, xylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone, and bis(4-β-hydroxyethoxyphenyl)sulfone. As the polyvalent alcohol, one kind thereof or a mixture of two or more kinds thereof can be used. Examples of the polyester-based resin include polyethylene terephthalate, polybutylene terephthalate, polybutylene succinate, polybutylene succinate adipate, polybutylene adipate terephthalate, polylactic acid, polyhydroxybutyric acid, polyethylene naphthalate, polyarylate, acid-modified polyester in which isophthalic acid is co-polymerized, and glycol-modified polyester (PET-G) in which 1,4-cyclohexanedimethanol is co-polymerized. The polyester-based resin may be used singly or in combination of two or more kinds thereof.

The polyester-based resin composition may further contain an additive as necessary. Examples of the additive include an antioxidant, an antistatic agent, an UV-ray absorber, an infrared-ray absorber, an anti-blocking agent, an anti-coloring agent, a deodorant, an anti-oxidizing agent, a nucleating agent, a thermal stabilizer, a flame retardant, and a lubricant. The additive may be used singly or in combination of two or more kinds thereof.

When the polyester-based resin composition is a masterbatch, the polyester-based resin composition contains preferably 1 to 60 parts by mass, more preferably 10 to 45 parts by mass, of the modifier per 100 parts by mass of the polyester-based resin and the modifier (the aforementioned (A) to (D) components) in total although the value is not limited in particular. On the other hand, when the polyester-based resin composition is the intermediate product in the manufacturing process, the content of the modifier can be changed arbitrarily in accordance with the manufacturing process. However, the polyester-based resin composition when molded into a film shape contains preferably 0.1 to 10 parts by mass, more preferably 1 to 6 parts by mass, of the modifier per 100 parts by mass of the polyester-based resin and the modifier (the aforementioned (A) to (D) components) in total.

<<Polyester-Based Resin Film>>

Next, the polyester-based resin film according to the present disclosure is described. The polyester-based resin film contains the polyester-based resin composition so that the polyester-based resin film contains the modifier at predetermined concentration. Note that, in the present disclosure, "polyester-based resin film containing polyester-based resin composition" refers to the polyester-based resin film containing the polyester-based resin composition as it is and moreover includes any polyester-based resin film containing the polyester-based resin composition of which component is changed, for example, in a process of molding the polyester-based resin composition as long as the anti-fogging property is improved.

When the total of the polyester-based resin and the modifier (the aforementioned (A) to (D) components) is 100 parts by mass, the polyester-based resin film contains preferably 0.1 to 10 parts by mass, more preferably 1 to 6 parts by mass, of the modifier.

<Manufacturing Method>

The polyester-based resin film according to the present disclosure can be manufactured by molding, into a film shape, the polyester-based resin composition containing the modifier at the predetermined concentration, and the manufacturing method may be a known method. For example, the polyester-based resin composition containing the modifier at the predetermined concentration can be manufactured by any of the following methods: (1) a method in which a masterbatch containing the polyester-based resin and the modifier at high concentration is manufactured in advance and this masterbatch is further mixed with the polyester-based resin; thus, a predetermined polyester-based resin composition is formed; (2) a method in which the polyester-based resin and the modifier are input in advance to a mixer such as a tumbler blender, a super mixer, or a Henschel mixer, and mixed therein, and this mixture is melted and kneaded by an extruder such as a single-screw extruder or a multi-screw extruder for granulation; thus, a predetermined polyester-based resin composition is formed; (3) a method in which the polyester-based resin is melted by an extruder such as a single-screw extruder or a multi-screw extruder, the modifier is mixed therein by side feed or liquid injection, and the mixture is melted and kneaded for granulation; thus, a predetermined polyester-based resin composition is formed; and (4) a method in which the methods of (2) and (3) are carried out in combination. The manufacture of the masterbatch by the method (1) can be performed in a manner similar to the methods (2), (3), and (4). The method of mixing the polyester-based resin and the modifier among the mixing in a mixer such as a tumbler blender, a super mixer, or a Henschel mixer, the side feed, and the liquid injection can be determined based on the shape of the polyester-based resin and the modifier. In the case of a solid, the mixing in a mixer such as a tumbler blender, a super mixer, or a Henschel mixer, or the side feed is employed. In the case of liquid, the liquid injection, or a mixer such as a super mixer or a Henschel mixer is employed. In the case of the solid, after the solid is dissolved or diffused in a liquid, the solid can be mixed as the liquid or a liquid body.

The method of molding the polyester-based resin film may be a known method. For example, inflation molding such as air-cooled inflation molding, air-cooled two-stage inflation molding, air-cooled three-stage inflation molding, or water-cooled inflation molding, and T-die molding using a straight manifold type, a coat-hanger type, a combination thereof, or the like as a T-die are given. Additionally, the film may be stretched, and a stretching method may be, for example, a tenter simultaneous biaxial stretching method, a sequential biaxial stretching method with a roll and a tenter, or a biaxial stretching method by an inflation method. The thickness of the film is preferably 3 to 350 µm; however, the thickness is not limited to this range.

<<Multilayer Film>>

The multilayer film is a multilayer film including two or more layers, and includes the polyester-based resin film containing the aforementioned modifier as a surface layer of at least one of the layers. Another layer of the multilayer film is formed of a thermoplastic resin, an adhesive, an anchor coat agent, an adhesive resin, or the like. Examples of the thermoplastic resin include polyesters such as polyolefin-based resin and polyethylene terephthalate, polyamides such as nylon 6, and acrylic resins such as polyvinyl alcohol, polystyrene, and methyl polymethacrylate. As the thermoplastic resin, the same polyester-based resin as the material contained in the polyester-based resin film can be used. The thermoplastic resin may contain an additive as appropriate. Examples of the additive include an UV-ray absorber, an infrared-ray absorber, an anti-blocking agent, an antistatic agent, an anti-fogging agent, a thermal stabilizer, a neutralizer, a plasticizer, a lubricant, a flame retardant, and a nucleating agent.

The multilayer film can be manufactured by a known method. Examples of the manufacturing method include a dry lamination method, a sandwich lamination method, an extrusion lamination method, and a co-extrusion method. In the case of manufacturing the multilayer film by the dry lamination method, the sandwich lamination method, or the extrusion lamination method, a known polyurethane-based adhesive, an organic titanium-based anchor coat agent, an isocyanate-based anchor coat agent, an adhesive resin, or the like can be used. In the manufacture by the co-extrusion method, the inflation molding or the T-die molding can be employed and the molding method without stretching or with stretching by a stretching method can also be used. The multilayer film has a thickness of preferably 5 to 1000 µm; however, the thickness is not limited to this range. The thickness ratio of the respective layers can be set arbitrarily.

The modifier for the polyester-based resin in the present disclosure contains the alkali metal salt of alkylaryl sulfonic acid (A) and the inorganic salt (B). Thus, the polyester-based resin film containing the modifier can have the excellent anti-fogging property.

EXAMPLES

Examples with more specific structures and effects of the present disclosure are hereinafter described. In Examples and Comparative Examples below, "part" means part by mass. Table 1 shows the components of the modifier and the mass ratio thereof in Examples and Comparative Examples.

Example 1-1

A modifier (K-1) was obtained by uniformly mixing 100 parts of a mixture (A-1) of branched sodium alkylbenzene sulfonate in which the alkyl group includes 9 to 16 carbons, as the alkali metal salt of alkylaryl sulfonic acid, 4.0 parts of sodium sulfate (B-1) as the inorganic salt, 50 parts of sodium alkyl sulfonate (C-1) in which the alkyl group includes 13 to 18 carbons, as the metal salt of alkyl sulfonic acid, and 50 parts of PEG-6000 (D-1) as the polyalkylene glycol.

Examples 1-2 to 1-19, and Comparative Examples 1-1 to 1-4

In a manner similar to the modifier (K-1) in Example 1-1, modifiers (K-2 to K-19) in Examples 1-2 to 1-19 and modifiers (k-1 to k-4) in Comparative Examples 1-1 to 1-4 with the compositions shown in Table 1 were obtained.

TABLE 1

| | | Modifier | | | | | | | |
|---|---|---|---|---|---|---|---|---|---|
| | | Alkali metal salt of alkylaryl sulfonic acid (A) | | Inorganic salt (B) | | Alkali metal salt of alkyl sulfonic acid (C) | | Polyalkylene glycol (D) | |
| | Kind | Kind | Content (parts) | Kind | Content (parts) | Kind | Content (parts) | Kind | Content (parts) |
| Example 1-1 | K-1 | A-1 | 100 | B-1 | 4.0 | C-1 | 50 | D-1 | 50 |
| Example 1-2 | K-2 | A-1 | 100 | B-1 | 1.0 | C-1 | 30 | D-1 | 70 |
| | | | | B-2 | 3.0 | | | | |
| Example 1-3 | K-3 | A-2 | 100 | B-2 | 7.0 | C-3 | 80 | D-2 | 30 |
| Example 1-4 | K-4 | A-1 | 100 | B-1 | 1.0 | C-1 | 20 | D-1 | 30 |
| | | | | B-2 | 1.0 | | | D-2 | 50 |

TABLE 1-continued

| | | Modifier | | | | | | | |
|---|---|---|---|---|---|---|---|---|---|
| | | Alkali metal salt of alkylaryl sulfonic acid (A) | | | Inorganic salt (B) | | Alkali metal salt of alkyl sulfonic acid (C) | | Polyalkylene glycol (D) | |
| | Kind | Kind | Content (parts) | Kind | Content (parts) | Kind | Content (parts) | Kind | Content (parts) |
| Example 1-5 | K-5 | A-2 | 100 | B-1 | 8.0 | C-2 | 50 | D-2 | 30 |
| | | | | | | C-3 | 50 | | |
| Example 1-6 | K-6 | A-1 | 100 | B-1 | 3.0 | C-1 | 50 | D-1 | 50 |
| | | | | B-2 | 1.0 | | | D-2 | 50 |
| Example 1-7 | K-7 | A-2 | 100 | B-2 | 4.0 | C-1 | 100 | D-1 | 300 |
| Example 1-8 | K-8 | A-3 | 100 | B-1 | 10.0 | C-1 | 40 | D-2 | 100 |
| | | | | | | C-2 | 10 | | |
| Example 1-9 | K-9 | A-4 | 100 | B-1 | 0.1 | C-3 | 10 | D-3 | 10 |
| Example 1-10 | K-10 | A-1 | 100 | B-1 | 4.0 | | | D-1 | 50 |
| Example 1-11 | K-11 | A-1 | 100 | B-2 | 4.0 | C-1 | 100 | | |
| Example 1-12 | K-12 | A-1 | 100 | B-1 | 1.0 | C-1 | 100 | | |
| | | | | B-2 | 3.0 | | | | |
| Example 1-13 | K-13 | A-1 | 100 | B-1 | 4.0 | | | D-1 | 900 |
| Example 1-14 | K-14 | A-1 | 100 | B-1 | 20.0 | C-1 | 300 | | |
| Example 1-15 | K-15 | A-2 | 100 | B-1 | 1.0 | | | | |
| Example 1-16 | K-16 | A-3 | 100 | B-3 | 15.0 | | | | |
| Example 1-17 | K-17 | A-4 | 100 | B-4 | 15.0 | | | | |
| Example 1-18 | K-18 | A-5 | 100 | B-3 | 12.0 | | | | |
| Example 1-19 | K-19 | A-6 | 100 | B-3 | 14.0 | | | | |
| Comparative Example 1-1 | k-1 | A-1 | 100 | b-1 | 4.0 | | | | |
| Comparative Example 1-2 | k-2 | a-1 | 100 | B-1 | 4.0 | | | | |
| Comparative Example 1-3 | k-3 | a-2 | 100 | B-1 | 4.0 | | | | |
| Comparative Example 1-4 | k-4 | A-4 | 100 | | | | | | |

The components in Table 1 are as follows.

Alkali metal salt of alkylaryl sulfonic acid (A)
A-1: Mixture of branched sodium alkylbenzene sulfonate in which the alkyl group includes 9 to 16 carbons
A-2: Isomer mixture of branched sodium alkylbenzene sulfonate in which the alkyl group includes 12 carbons
A-3: Isomer mixture of branched sodium alkylbenzene sulfonate in which the alkyl group includes 6 carbons
A-4: Isomer mixture of branched sodium alkylbenzene sulfonate in which the alkyl group includes 22 carbons
A-5: Isomer mixture of branched lithium alkylbenzene sulfonate in which the alkyl group includes 12 carbons
A-6: (Straight chain type) sodium dodecylbenzene sulfonate
a-1: (Straight chain type) calcium dodecylbenzene sulfonate
a-2: (Straight chain type) sodium 4-methylbenzene sulfonate Inorganic Salt (B)
B-1: Sodium sulfate
B-2: Sodium chloride
B-3: Potassium sulfate
B-4: Lithium chloride
b-1: Magnesium chloride Alkali Metal Salt of Alkyl Sulfonic Acid (C)
C-1: Sodium alkyl sulfonate in which the alkyl group includes 13 to 18 carbons
C-2: Lithium hexylsulfonate
C-3: Sodium docosylsulfonate Polyalkylene Glycol (D)
D-1: PEG-6000
D-2: PEG-400
D-3: PEG-13000

Table 2 shows the raw materials of masterbatches (polyester-based resin compositions) in Examples and Comparative Examples.

Example 2-1

A strand was obtained by supplying 80 parts of the polyester-based resin with a product name "RAMAPET N-1" (manufactured by Indorama Ventures Public Company Limited) (R-1) and 20 parts of the modifier (K-1) obtained in Example 1-1 to a coaxial twin-screw kneading extruder using a feeder, melting and kneading the mixture at 250 to 290° C., extruding the mixture from a strand die, and rapidly cooling the mixture with water. This strand was cut with a pelletizer to obtain a masterbatch (N-1) in which the modifier (K-1) was diffused in the polyester-based resin.

Examples 2-2 to 2-19, and Comparative Examples 2-1 to 2-4

In a manner similar to the masterbatch (N-1) in Example 2-1, masterbatches (N-2 to N-19) in Examples 2-2 to 2-19 and masterbatches (n-1 to n-4) in Comparative Examples 2-1 to 2-4 with the compositions shown in Table 2 were obtained.

TABLE 2

| | Masterbatch | | | | |
|---|---|---|---|---|---|
| | | Raw material | | | |
| | | Polyester-based resin | | Modifier | |
| | Kind | Kind | Content (parts) | Kind | Content (parts) |
| Example 2-1 | N-1 | R-1 | 80 | K-1 | 20 |
| Example 2-2 | N-2 | R-2 | 80 | K-2 | 20 |

TABLE 2-continued

| | | Masterbatch | | | |
|---|---|---|---|---|---|
| | | Raw material | | | |
| | | Polyester-based resin | | Modifier | |
| | Kind | Kind | Content (parts) | Kind | Content (parts) |
| Example 2-3 | N-3 | R-3 | 80 | K-3 | 20 |
| Example 2-4 | N-4 | R-1 | 55 | K-4 | 45 |
| Example 2-5 | N-5 | R-1 | 55 | K-5 | 45 |
| Example 2-6 | N-6 | R-3 | 70 | K-6 | 30 |
| Example 2-7 | N-7 | R-1 | 70 | K-7 | 30 |
| Example 2-8 | N-8 | R-1 | 70 | K-8 | 30 |
| Example 2-9 | N-9 | R-1 | 80 | K-9 | 20 |
| Example 2-10 | N-10 | R-1 | 90 | K-10 | 10 |
| Example 2-11 | N-11 | R-1 | 80 | K-11 | 20 |
| Example 2-12 | N-12 | R-1 | 80 | K-12 | 20 |
| Example 2-13 | N-13 | R-3 | 80 | K-13 | 20 |
| Example 2-14 | N-14 | R-1 | 80 | K-14 | 20 |
| Example 2-15 | N-15 | R-3 | 80 | K-15 | 20 |
| Example 2-16 | N-16 | R-1 | 80 | K-16 | 20 |
| Example 2-17 | N-17 | R-1 | 80 | K-17 | 20 |
| Example 2-18 | N-18 | R-1 | 80 | K-18 | 20 |
| Example 2-19 | N-19 | R-1 | 80 | K-19 | 20 |
| Comparative Example 2-1 | n-1 | R-1 | 80 | k-1 | 20 |
| Comparative Example 2-2 | n-2 | R-1 | 80 | k-2 | 20 |
| Comparative Example 2-3 | n-3 | R-1 | 80 | k-3 | 20 |
| Comparative Example 2-4 | n-4 | R-1 | 80 | k-4 | 20 |

In Table 2, R-1 to R-3 express the following products:
R-1: Product name "RAMAPET N-1" (manufactured by Indorama Ventures Public Company Limited)
R-2: Product name: "BELLPET VH800S-R" (manufactured by Bell Polyester Products. Inc.)
R-3: Product name: "EASTER GN001" (manufactured by Eastman Chemical Japan Limited)

Table 3 shows the results of evaluating the productivity of each masterbatch (N-1 to N-19, n-1 to n-4). Note that the productivity of the masterbatch was evaluated by the following method.

<Productivity of Masterbatch>
When the masterbatches (N-1 to N-19, n-1 to n-4) were manufactured, the manufacturing stability of the masterbatches was observed with eyes and evaluated based on the following criterion.
3: Neither vent-up nor strand disorder occurred.
2: Vent-up did not occur but strand disorder occurred.
1: Vent-up occurred.

TABLE 3

| | Masterbatch | |
|---|---|---|
| | Kind | Productivity |
| Example 2-1 | N-1 | 3 |
| Example 2-2 | N-2 | 3 |
| Example 2-3 | N-3 | 3 |
| Example 2-4 | N-4 | 3 |
| Example 2-5 | N-5 | 3 |
| Example 2-6 | N-6 | 3 |
| Example 2-7 | N-7 | 3 |
| Example 2-8 | N-8 | 3 |
| Example 2-9 | N-9 | 3 |
| Example 2-10 | N-10 | 3 |
| Example 2-11 | N-11 | 3 |
| Example 2-12 | N-12 | 3 |
| Example 2-13 | N-13 | 2 |

TABLE 3-continued

| | Masterbatch | |
|---|---|---|
| | Kind | Productivity |
| Example 2-14 | N-14 | 3 |
| Example 2-15 | N-15 | 3 |
| Example 2-16 | N-16 | 3 |
| Example 2-17 | N-17 | 3 |
| Example 2-18 | N-18 | 2 |
| Example 2-19 | N-19 | 2 |
| Comparative Example 2-1 | n-1 | 3 |
| Comparative Example 2-2 | n-2 | 3 |
| Comparative Example 2-3 | n-3 | 1 |
| Comparative Example 2-4 | n-4 | 3 |

The masterbatches in Examples 2-1 to 2-19 were manufactured suitably. On the other hand, in the masterbatch in Comparative Example 2-3, vent-up occurred and the productivity was inferior. The comparison among Examples 2-15, 2-16, and 2-18 indicates that the alkali metal salt of alkylaryl sulfonic acid (A), which is sodium salt, was superior in masterbatch productivity to the alkali metal salt of alkylaryl sulfonic acid (A), which is lithium salt. The comparison among Examples 2-15, 2-16, and 2-19 indicates that the alkali metal salt of alkylaryl sulfonic acid (A) that is a branched type was superior in masterbatch productivity to the alkali metal salt of alkylaryl sulfonic acid (A) that is a straight chain type.

Table 4 shows the raw material for manufacturing the film (polyester-based resin film), the composition of the film, the presence or absence of the biaxial stretching step at the manufacture, and the thickness of the film in each of Examples and Comparative Examples. In the column of the raw material of the film, the use quantity of each of the polyester-based resin and the masterbatch at the manufacture of the film is shown. In the column of the composition of the film, the content of each of the polyester-based resin and the modifier of the obtained film is shown.

Example 3-1

A mixture of 90 parts of the polyester-based resin with a product name "RAMAPET N-1" (R-1) and 10 parts of the masterbatch (N-1) was supplied to a coaxial twin-screw kneading extruder using a feeder, and melted and kneaded at 260 to 280° C. Next, the mixture was reeled on a cool roll with a temperature kept at 30° C. while the supply quantity of the melted resin and the screw rotation speed were adjusted using a multi manifold T-die, and thus, an unstretched film was obtained. The obtained unstretched film was stretched three times vertically and four times horizontally at 110° C. and then, heated at 235° C. and gradually cooled to room temperature, and thus, a film (F-1) with a thickness of 15 μm was obtained.

Examples 3-2 to 3-19 and Comparative Examples 3-1 to 3-4

In a manner similar to the film (F-1) in Example 3-1, films (F-2 to F-19) in Examples 3-2 to 3-19 and films (f-1 to f-4) in Comparative Examples 3-1 to 3-4 with the compositions and film thicknesses shown in Table 4 were obtained. In a case of not performing biaxial stretching, steps up to the step of obtaining the unstretched film in Example 3-1 were performed.

TABLE 4

| | Film | Raw material Polyester-based resin Kind | Use quantity (parts) | Masterbatch Kind | Use quantity (parts) | Composition Polyester-based resin Content (parts) | Modifier Kind | Content (parts) | Biaxial stretching | Thickness (μm) |
|---|---|---|---|---|---|---|---|---|---|---|
| Example 3-1 | F-1 | R-1 | 90 | N-1 | 10 | 98 | K-1 | 2 | Present | 15 |
| Example 3-2 | F-2 | R-2 | 80 | N-2 | 20 | 96 | K-2 | 4 | Present | 6 |
| Example 3-3 | F-3 | R-3 | 95 | N-3 | 5 | 99 | K-3 | 1 | Absent | 60 |
| Example 3-4 | F-4 | R-4 | 92 | N-4 | 8 | 96.4 | K-4 | 3.6 | Present | 10 |
| Example 3-5 | F-5 | R-1 | 95 | N-5 | 5 | 97.75 | K-5 | 2.25 | Present | 15 |
| Example 3-6 | F-6 | R-1 | 90 | N-6 | 10 | 97 | K-6 | 3 | Present | 15 |
| Example 3-7 | F-7 | R-1 | 87 | N-7 | 13 | 96.1 | K-7 | 3.9 | Present | 15 |
| Example 3-8 | F-8 | R-1 | 96 | N-8 | 4 | 98.8 | K-8 | 1.2 | Present | 40 |
| Example 3-9 | F-9 | R-1 | 90 | N-9 | 10 | 98 | K-9 | 2 | Present | 15 |
| Example 3-10 | F-10 | R-1 | 80 | N-10 | 20 | 98 | K-10 | 2 | Present | 15 |
| Example 3-11 | F-11 | R-1 | 85 | N-11 | 15 | 97 | K-11 | 3 | Present | 15 |
| Example 3-12 | F-12 | R-1 | 95 | N-12 | 5 | 99 | K-12 | 1 | Absent | 100 |
| Example 3-13 | F-13 | R-3 | 80 | N-13 | 20 | 96 | K-13 | 4 | Present | 15 |
| Example 3-14 | F-14 | R-1 | 92 | N-14 | 8 | 98.4 | K-14 | 1.6 | Present | 15 |
| Example 3-15 | F-15 | R-3 | 90 | N-15 | 10 | 98 | K-15 | 2 | Present | 15 |
| Example 3-16 | F-16 | R-1 | 95 | N-16 | 5 | 99 | K-16 | 1 | Present | 15 |
| Example 3-17 | F-17 | R-1 | 80 | N-17 | 20 | 96 | K-17 | 4 | Present | 15 |
| Example 3-18 | F-18 | R-1 | 90 | N-18 | 10 | 98 | K-18 | 2 | Present | 15 |
| Example 3-19 | F-19 | R-1 | 90 | N-19 | 10 | 98 | K-19 | 2 | Present | 15 |
| Comparative Example 3-1 | f-1 | R-1 | 95 | n-1 | 5 | 99 | k-1 | 1 | Present | 15 |
| Comparative Example 3-2 | f-2 | R-1 | 90 | n-2 | 10 | 98 | k-2 | 2 | Present | 15 |
| Comparative Example 3-3 | f-3 | R-1 | 90 | n-3 | 10 | 98 | k-3 | 2 | Present | 15 |
| Comparative Example 3-4 | f-4 | R-1 | 90 | n-4 | 10 | 98 | k-4 | 2 | Present | 15 |

In Table 4, R-4 expresses the following product. R-4: Product name "SKYBON ES-220" (manufactured by SK Chemicals)

Table 5 shows the results of evaluating the anti-fogging property, the transparency, and the productivity about the films (F-1 to F-19, f-1 to f-4). Note that the anti-fogging property, the transparency, and the productivity were evaluated by the following methods.

<Anti-Fogging Property>

After the film was held at 20° C. with a relative humidity of 65% in a manner that the humidity was adjusted for 24 hours, the film was attached to an opening of a beaker containing water of 40° C. and left at rest in the atmosphere of 5° C. After 24 hours, the anti-fogging property was evaluated based on the following criterion in accordance with the adhesion of water droplets to the film and the visibility of the inside of the beaker through the film.

5: Water droplets do not adhere, and the inside of the beaker is clearly visible.
4: Large water droplets adhere, but the inside of the beaker is visible.
3: Large water droplets adhere, making it difficult to see the inside of the beaker.
2: Small water droplets and large water droplets adhere, making it difficult to see the inside of the beaker.
1: Many small water droplets adhere, making it impossible to see the inside of the beaker.

<Transparency>

After the film was held at 20° C. with a relative humidity of 65% in a manner that the humidity was adjusted for 24 hours, the haze value was measured by a method based on JIS K 7136: 2000 using a haze meter ("NDH-5000" manufactured by NIPPON DENSHOKU INDUSTRIES Co., Ltd.). Based on the measured haze values, the transparency was evaluated in accordance with the following criterion.

4: Less than 10%
3: 10% or more and less than 20%
2: 20% or more and less than 30%
1: 30% or more <Productivity>

When the films (F-1 to F-19, f-1 to f-4) were manufactured, the time for which the operation was continued without causing device contamination derived from a smoke-producing component in a process of melting and kneading the raw material in the coaxial twin-screw kneading extruder was measured and the evaluation was performed in accordance with the following criterion.

3: More than 20 hours
2: More than 4 hours and 20 hours or less
1: 4 hours or less

TABLE 5

| | Film | Evaluation Anti-fogging property | Transparency | Productivity |
|---|---|---|---|---|
| Example 3-1 | F-1 | 5 | 4 | 3 |
| Example 3-2 | F-2 | 5 | 4 | 3 |
| Example 3-3 | F-3 | 5 | 4 | 3 |
| Example 3-4 | F-4 | 5 | 4 | 3 |
| Example 3-5 | F-5 | 5 | 4 | 3 |
| Example 3-6 | F-6 | 5 | 4 | 3 |
| Example 3-7 | F-7 | 5 | 4 | 3 |
| Example 3-8 | F-8 | 5 | 4 | 3 |
| Example 3-9 | F-9 | 5 | 4 | 3 |
| Example 3-10 | F-10 | 4 | 4 | 3 |
| Example 3-11 | F-11 | 4 | 4 | 3 |
| Example 3-12 | F-12 | 4 | 4 | 3 |
| Example 3-13 | F-13 | 4 | 4 | 2 |
| Example 3-14 | F-14 | 4 | 3 | 3 |
| Example 3-15 | F-15 | 3 | 4 | 3 |

TABLE 5-continued

| | | Evaluation | | |
|---|---|---|---|---|
| | Film | Anti-fogging property | Transparency | Productivity |
| Example 3-16 | F-16 | 3 | 2 | 3 |
| Example 3-17 | F-17 | 3 | 2 | 3 |
| Example 3-18 | F-18 | 2 | 2 | 3 |
| Example 3-19 | F-19 | 2 | 2 | 3 |
| Comparative Example 3-1 | f-1 | 1 | 2 | 3 |
| Comparative Example 3-2 | f-2 | 1 | 4 | 3 |
| Comparative Example 3-3 | f-3 | 1 | 1 | 2 |
| Comparative Example 3-4 | f-4 | 1 | 4 | 3 |

In Examples 3-1 to 3-19, the anti-fogging property, the transparency, and the productivity were excellent. In Comparative Examples 3-1 and 3-4, on the other hand, none of sodium sulfate, potassium sulfate, lithium sulfate, sodium chloride, potassium chloride, and lithium chloride were contained; thus, the anti-fogging property was inferior. In Comparative Examples 3-2 and 3-3, the alkali metal salt of alkylaryl sulfonic acid in which the alkyl group includes 6 to 22 carbons was not contained; thus, the anti-fogging property was inferior.

Table 6 shows the multilayer film in each of Examples and Comparative Examples. The multilayer film includes A layers, each of which is a film containing the modifier, and a B layer disposed between the two A layers and formed of the polyester-based resin. In the column of the raw material of the A layer, the use quantity of the polyester-based resin and the masterbatch at the manufacture of the film is shown. In the column of the composition of the A layer, the content of the polyester-based resin and the modifier of the manufactured A layer is shown. Table 6 shows the thickness ratio of the respective layers, the presence or absence of the biaxial stretching step at the manufacture of the multilayer film, and the thickness of the multilayer film.

Example 4-1

A mixture of 90 parts of the product "RAMAPET N-1" (R-1) and 10 parts of the masterbatch (N-1) was supplied to a first coaxial twin-screw kneading extruder using a feeder, and melted and kneaded at 260 to 280° C. On the other hand, only the product "RAMAPET N-1" (R-1) was supplied to a second coaxial twin-screw kneading extruder, and melted and kneaded at 260 to 280° C. Next, the mixture was reeled on a cool roll with a temperature kept at 30° C. by being co-extruded so that the layers formed of the melted resin containing the modifier became both surface layers and the layer formed of the melted resin not containing the modifier became the intermediate layer while the supply quantity of the melted resin and the screw rotation speed were adjusted using a multi manifold T-die, and thus, a multilayer unstretched film in which the thickness ratio among the A layer (one surface layer), the B layer (intermediate layer), and the A layer (another surface layer) was 1:1:1 was obtained. The obtained multilayer unstretched film was stretched three times vertically and four times horizontally at 110° C. and then, heated at 235° C. and gradually cooled to room temperature, and thus, a multilayer film (M-1) with a thickness of 45 μm was obtained.

Examples 4-2 to 4-19, and Comparative Examples 4-1 to 4-4

In a manner similar to the multilayer film (M-1) in Example 4-1, films (M-2 to M-19) in Examples 4-2 to 4-19 and films (m-1 to m-4) in Comparative Examples 4-1 to 4-4 with the compositions and film thicknesses shown in Table 6 were obtained. In a case of not performing biaxial stretching, steps up to the step of obtaining the multilayer unstretched film in Example 4-1 were performed.

TABLE 6

| | | | | Multilayer film | | | | | | | | | | |
|---|---|---|---|---|---|---|---|---|---|---|---|---|---|---|
| | | | A layer | | | | | | B layer | | | | | |
| | | Raw material | | | | Composition | | | Raw material | | | | | |
| | | Polyester-based resin | | Masterbatch | | Polyester-based resin | | Modifier | Polyester-based resin | | Layer thickness ratio (A layer/B layer/A layer) | | | Film |
| | Kind | Kind | Use quantity (parts) | Kind | Use quantity (parts) | Content (parts) | Kind | Content (parts) | Kind | Use quantity (parts) | A layer | B layer | A layer | Biaxial stretching | thickness (μm) |
| Example 4-1 | M-1 | R-1 | 90 | N-1 | 10 | 98 | K-1 | 2 | R-1 | 100 | 1 | 1 | 1 | Present | 45 |
| Example 4-2 | M-2 | R-2 | 80 | N-2 | 20 | 94 | K-2 | 6 | R-2 | 100 | 1 | 8 | 1 | Present | 20 |
| Example 4-3 | M-3 | R-3 | 95 | N-3 | 5 | 99 | K-3 | 1 | R-3 | 100 | 2 | 6 | 2 | Absent | 300 |
| Example 4-4 | M-4 | R-4 | 92 | N-4 | 8 | 96.4 | K-4 | 3.6 | R-1 | 100 | 1 | 1 | 1 | Present | 30 |
| Example 4-5 | M-5 | R-1 | 95 | N-5 | 5 | 97.75 | K-5 | 2.25 | R-1 | 100 | 3 | 4 | 3 | Present | 40 |
| Example 4-6 | M-6 | R-1 | 90 | N-6 | 10 | 97 | K-6 | 3 | R-1 | 100 | 2 | 6 | 2 | Present | 40 |
| Example 4-7 | M-7 | R-1 | 87 | N-7 | 13 | 96.1 | K-7 | 3.9 | R-1 | 100 | 2 | 6 | 2 | Present | 40 |
| Example 4-8 | M-8 | R-1 | 96 | N-8 | 4 | 98.8 | K-8 | 1.2 | R-1 | 100 | 2 | 6 | 2 | Present | 40 |
| Example 4-9 | M-9 | R-1 | 90 | N-9 | 10 | 98 | K-9 | 2 | R-1 | 100 | 2 | 6 | 2 | Present | 40 |
| Example 4-10 | M-10 | R-1 | 80 | N-10 | 20 | 98 | K-10 | 2 | R-1 | 100 | 2 | 6 | 2 | Present | 40 |
| Example 4-11 | M-11 | R-1 | 85 | N-11 | 15 | 97 | K-11 | 3 | R-1 | 100 | 1 | 8 | 1 | Present | 40 |
| Example 4-12 | M-12 | R-1 | 95 | N-12 | 5 | 99 | K-12 | 1 | R-1 | 100 | 3 | 4 | 3 | Absent | 330 |
| Example 4-13 | M-13 | R-3 | 80 | N-13 | 20 | 96 | K-13 | 4 | R-3 | 100 | 2 | 6 | 2 | Present | 40 |
| Example 4-14 | M-14 | R-1 | 92 | N-14 | 8 | 98.4 | K-14 | 1.6 | R-1 | 100 | 2 | 6 | 2 | Present | 40 |
| Example 4-15 | M-15 | R-3 | 90 | N-15 | 10 | 98 | K-15 | 2 | R-3 | 100 | 2 | 6 | 2 | Present | 40 |

TABLE 6-continued

| | Multilayer film | | | | | | | | | | | | | |
|---|---|---|---|---|---|---|---|---|---|---|---|---|---|---|
| | A layer | | | | | | | | B layer | | | | | |
| | Raw material | | | | Composition | | | | Raw material | | Layer thickness | | | |
| | Polyester-based resin | Masterbatch | | | Polyester-based resin | Modifier | | | Polyester-based resin | | ratio (A layer/B layer/A layer) | | | Film |
| | | Use | | Use | | | | | Use | | | | | |
| | | quantity | | quantity | Content | | Content | | quantity | A | B | A | Biaxial | thickness |
| | Kind | Kind | (parts) | Kind | (parts) | (parts) | Kind | (parts) | Kind | (parts) | layer | layer | layer | stretching | (μm) |
| Example 4-16 | M-16 | R-1 | 95 | N-16 | 5 | 99 | K-16 | 1 | R-1 | 100 | 2 | 6 | 2 | Present | 40 |
| Example 4-17 | M-17 | R-1 | 80 | N-17 | 20 | 96 | K-17 | 4 | R-1 | 100 | 2 | 6 | 2 | Present | 40 |
| Example 4-18 | M-18 | R-1 | 90 | N-18 | 10 | 98 | K-18 | 2 | R-1 | 100 | 2 | 6 | 2 | Present | 40 |
| Example 4-19 | M-19 | R-1 | 90 | N-19 | 10 | 98 | K-19 | 2 | R-1 | 100 | 1 | 8 | 1 | Present | 40 |
| Comparative Example 4-1 | m-1 | R-1 | 95 | n-1 | 5 | 99 | k-1 | 1 | R-1 | 100 | 2 | 6 | 2 | Present | 40 |
| Comparative Example 4-2 | m-2 | R-1 | 90 | n-2 | 10 | 98 | k-2 | 2 | R-1 | 100 | 2 | 6 | 2 | Present | 40 |
| Comparative Example 4-3 | m-3 | R-1 | 90 | n-3 | 10 | 98 | k-3 | 2 | R-1 | 100 | 2 | 6 | 2 | Present | 40 |
| Comparative Example 4-4 | m-4 | R-1 | 90 | n-4 | 10 | 98 | k-4 | 2 | R-1 | 100 | 2 | 6 | 2 | Present | 40 |

Table 7 shows the results of evaluating the anti-fogging property, the transparency, and the productivity about the multilayer film.

TABLE 7

| | | Evaluation | | |
|---|---|---|---|---|
| | Multilayer film | Anti-fogging property | Transparency | Productivity |
| Example 4-1 | M-1 | 5 | 4 | 3 |
| Example 4-2 | M-2 | 5 | 4 | 3 |
| Example 4-3 | M-3 | 5 | 4 | 3 |
| Example 4-4 | M-4 | 5 | 4 | 3 |
| Example 4-5 | M-5 | 5 | 4 | 3 |
| Example 4-6 | M-6 | 5 | 4 | 3 |
| Example 4-7 | M-7 | 5 | 4 | 3 |
| Example 4-8 | M-8 | 5 | 4 | 3 |
| Example 4-9 | M-9 | 5 | 4 | 3 |
| Example 4-10 | M-10 | 4 | 4 | 3 |
| Example 4-11 | M-11 | 4 | 4 | 3 |
| Example 4-12 | M-12 | 4 | 4 | 3 |
| Example 4-13 | M-13 | 4 | 4 | 2 |
| Example 4-14 | M-14 | 4 | 3 | 3 |
| Example 4-15 | M-15 | 3 | 4 | 3 |
| Example 4-16 | M-16 | 3 | 2 | 3 |
| Example 4-17 | M-17 | 3 | 2 | 3 |
| Example 4-18 | M-18 | 2 | 2 | 3 |
| Example 4-19 | M-19 | 2 | 2 | 3 |
| Comparative Example 4-1 | m-1 | 1 | 2 | 3 |
| Comparative Example 4-2 | m-2 | 1 | 4 | 3 |
| Comparative Example 4-3 | m-3 | 1 | 1 | 2 |
| Comparative Example 4-4 | m-4 | 1 | 4 | 3 |

In Examples 4-1 to 4-19, the anti-fogging property, the transparency, and the productivity were excellent. In Comparative Examples 4-1 and 4-4, on the other hand, the A layer contained none of sodium sulfate, potassium sulfate, lithium sulfate, sodium chloride, potassium chloride, and lithium chloride; thus, the anti-fogging property was inferior. In Comparative Examples 4-2 and 4-3, since the A layer did not contain the alkali metal salt of alkylaryl sulfonic acid in which the alkyl group includes 6 to 22 carbons, the anti-fogging property was inferior.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A modifier for a polyester-based resin film, comprising alkali metal salt of alkylaryl sulfonic acid (A) in which the alkyl group includes 6 to 22 carbons, an inorganic salt (B) below, and polyalkylene glycol (D),
    wherein the alkyl group of the alkali metal salt of alkylaryl sulfonic acid (A) is a branched alkyl group, and the polyalkylene glycol (D) is polyethylene glycol,
    the inorganic salt (B) being at least one selected from sodium sulfate, potassium sulfate, lithium sulfate, sodium chloride, potassium chloride, and lithium chloride.

2. The modifier for a polyester-based resin film according to claim 1, wherein the polyalkylene glycol (D) is contained by 10 to 300 parts by mass per 100 parts by mass of the alkali metal salt of alkylaryl sulfonic acid (A).

3. The modifier for a polyester-based resin film according to claim 1, further comprising alkali metal salt of alkyl sulfonic acid (C) in which the alkyl group includes 6 to 22 carbons.

4. The modifier for a polyester-based resin film according to claim 1, wherein the inorganic salt (B) is contained by 0.1 to 20 parts by mass per 100 parts by mass of the alkali metal salt of alkylaryl sulfonic acid (A).

5. A polyester-based resin composition comprising alkali metal salt of alkylaryl sulfonic acid (A) in which the alkyl group includes 6 to 22 carbons, an inorganic salt (B) below, polyalkylene glycol (D), and a polyester-based resin,
  wherein the alkyl group of the alkali metal salt of alkylaryl sulfonic acid (A) is a branched alkyl group, and the polyalkylene glycol (D) is polyethylene glycol,
  the inorganic salt (B) being at least one selected from sodium sulfate, potassium sulfate, lithium sulfate, sodium chloride, potassium chloride, and lithium chloride.

6. The polyester-based resin composition according to claim 5, wherein the polyalkylene glycol (D) is contained by 10 to 300 parts by mass per 100 parts by mass of the alkali metal salt of alkylaryl sulfonic acid (A).

7. The polyester-based resin composition according to claim 5, further comprising alkali metal salt of alkyl sulfonic acid (C) in which the alkyl group includes 6 to 22 carbons.

8. The polyester-based resin composition according to claim 7, wherein the alkali metal salt of alkyl sulfonic acid (C) is contained by 10 to 300 parts by mass per 100 parts by mass of the alkali metal salt of alkylaryl sulfonic acid (A).

9. The polyester-based resin composition according to claim 5, wherein the alkali metal salt of alkylaryl sulfonic acid (A) is sodium salt.

10. The polyester-based resin composition according to claim 5, wherein the inorganic salt (B) is at least one selected from sodium sulfate and sodium chloride.

11. The polyester-based resin composition according to claim 5, wherein the inorganic salt (B) is contained by 0.1 to 20 parts by mass per 100 parts by mass of the alkali metal salt of alkylaryl sulfonic acid (A).

12. A polyester-based resin film comprising the polyester-based resin composition according to claim 5.

13. A multilayer film comprising two or more layers, wherein a surface layer of at least one of the layers is the polyester-based resin film according to claim 12.

* * * * *